(12) United States Patent
Yamada

(10) Patent No.: US 9,291,207 B2
(45) Date of Patent: Mar. 22, 2016

(54) CONSTANT VELOCITY UNIVERSAL JOINT AND METHOD FOR PRODUCING SAME

(75) Inventor: Kenji Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 52 days.

(21) Appl. No.: 14/238,260

(22) PCT Filed: Aug. 22, 2012

(86) PCT No.: PCT/JP2012/071196
§ 371 (c)(1),
(2), (4) Date: Feb. 11, 2014

(87) PCT Pub. No.: WO2013/027763
PCT Pub. Date: Feb. 28, 2013

(65) Prior Publication Data
US 2014/0221108 A1  Aug. 7, 2014

(30) Foreign Application Priority Data
Aug. 22, 2011  (JP) ................ 2011-180575

(51) Int. Cl.
*F16D 3/223*  (2011.01)
*F16D 3/24*  (2006.01)
(Continued)

(52) U.S. Cl.
CPC  *F16D 3/24* (2013.01); *F16D 3/223* (2013.01); *F16D 3/2233* (2013.01);
(Continued)

(58) Field of Classification Search
CPC .......... F16D 3/22; F16D 3/223; F16D 3/2233; F16D 3/2237; F16D 3/2245; F16D 3/24; F16D 2003/22306; F16D 2003/22309; F16D 2250/0053; F16D 2300/10
See application file for complete search history.

(56) References Cited

U.S. PATENT DOCUMENTS 6,749,517 B2 * 6/2004 Ouchi ........................ 464/906
8,172,962 B2 * 5/2012 Kobayashi ................ 464/906
(Continued)

FOREIGN PATENT DOCUMENTS

| CN | 101096980 | 1/2008 |
| CN | 101484717 | 7/2009 |

(Continued)

OTHER PUBLICATIONS

International Preliminary Report on Patentability and Translation of Written Opinion of the International Searching Authority issued Mar. 6, 2014 in International (PCT) Application No. PCT/JP2012/071196.

(Continued)

*Primary Examiner* — Josh Skroupa
(74) *Attorney, Agent, or Firm* — Wenderoth, Lind & Ponack, L.L.P.

(57) ABSTRACT

A constant velocity universal includes an outer joint member having an inner peripheral surface including track grooves that are formed at a plurality of positions on the inner peripheral surface and extend in an axial direction, and an inner joint member having an outer peripheral surface including track grooves that are formed at a plurality of positions on the outer peripheral surface and in pairs with the track grooves of the outer joint member, the track grooves extending in the axial direction. Balls are interposed between the track grooves of the outer and inner joint members. A track chamfer is provided at each boundary portion between each of the track grooves and the inner peripheral surface of the outer joint member, and a track chamfer is provided at each boundary portion between each of the track grooves and the outer peripheral surface of the inner joint member.

13 Claims, 6 Drawing Sheets

(51) Int. Cl.
  *F16D 3/2237* (2011.01)
  *F16D 3/2245* (2011.01)
  *F16D 3/2233* (2011.01)

(52) U.S. Cl.
  CPC ........... *F16D 3/2237* (2013.01); *F16D 3/2245* (2013.01); *F16D 2003/22306* (2013.01); *F16D 2003/22309* (2013.01); *F16D 2250/0053* (2013.01); *F16D 2300/10* (2013.01)

(56) References Cited

U.S. PATENT DOCUMENTS

| | | | |
|---|---|---|---|
| 8,684,849 B2 * | 4/2014 | Sone et al. ................... | 464/145 |
| 2010/0029396 A1 | 2/2010 | Fujio et al. | |
| 2011/0003645 A1 | 1/2011 | Ooba et al. | |
| 2012/0220382 A1 | 8/2012 | Sone et al. | |

FOREIGN PATENT DOCUMENTS

| | | |
|---|---|---|
| JP | 08-121492 | 5/1996 |
| JP | 2005-098450 | 4/2005 |
| JP | 4041657 | 1/2008 |
| JP | 2008-298270 | 12/2008 |
| JP | 2009-97629 | 5/2009 |
| JP | 2009-121673 | 6/2009 |
| JP | 2011-133107 | 7/2011 |

OTHER PUBLICATIONS

International Search Report issued Sep. 18, 2012 in International (PCT) Application No. PCT/JP2012/071196.

Chinese Office Action issued Aug. 24, 2015 in corresponding Chinese Patent Application No. 201280041029.3 with English Translation.

* cited by examiner

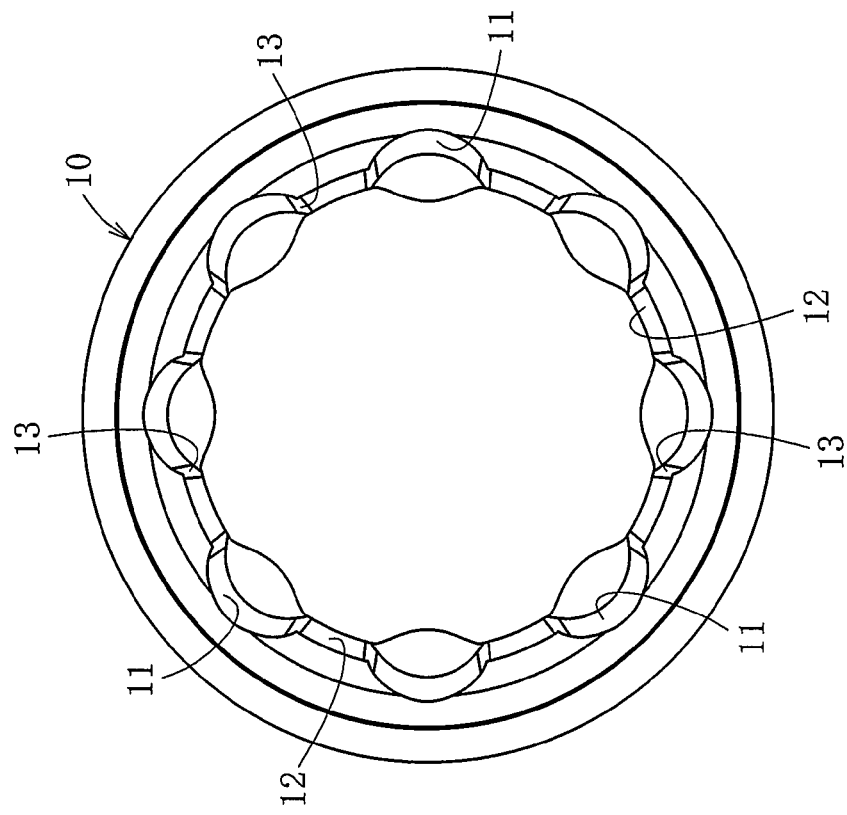
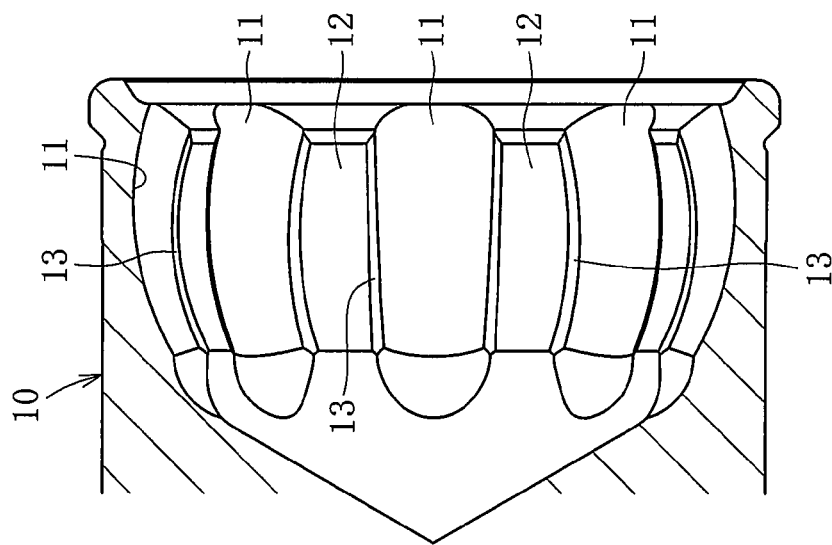

CONSTANT VELOCITY UNIVERSAL JOINT AND METHOD FOR PRODUCING SAME

This application is a U.S. national stage application of International (PCT) Application No. PCT/JP2012/071196, filed on Aug. 22, 2012, which claims priority to Japanese Application No. 2011-180575, filed on Aug. 22, 2011.

TECHNICAL FIELD

The present invention relates to a constant velocity universal joint to be used in a power transmission system for automobiles, aircrafts, ships, and various industrial machines, specifically, a constant velocity universal joint to be incorporated in a drive shaft, a propeller shaft, and the like that are used, for example, in a 4WD vehicle and a FR vehicle. The present invention also relates to a method of producing the constant velocity universal joint.

BACKGROUND ART

Constant velocity universal joints to be used as, for example, means for transmitting a rotational force from an engine of an automobile to wheels at constant velocity are classified into such two types as a fixed type constant velocity universal joint and a plunging type constant velocity universal joint. The two types of constant velocity universal joints have a structure capable of transmitting rotational torque at constant velocity even when two shafts, namely, a drive shaft and a driven shaft are coupled to each other to form an operating angle.

Drive shafts for transmitting power from the engine of the automobile to driving wheels need to allow angular displacement and axial displacement along with changes in relative positional relationship between the engine and the wheels. Thus, the drive shafts each generally include a plunging type constant velocity universal joint on the engine side (inboard side), a fixed type constant velocity universal joint on the driving wheel side (outboard side), and an interconnecting shaft for coupling the two types of constant velocity universal joints to each other.

The fixed type constant velocity universal joint and the plunging type constant velocity universal joint each generally include an outer joint member having an inner peripheral surface including track grooves that are formed at a plurality of positions on the inner peripheral surface and extend in an axial direction, an inner joint member having an outer peripheral surface including track grooves that are formed at a plurality of positions on the outer peripheral surface and in pairs with the track grooves of the outer joint member, the track grooves of the inner joint member extending in the axial direction, and torque transmitting members interposed between the track grooves of the outer joint member and the track grooves of the inner joint member.

Examples of the fixed type constant velocity universal joint include a Rzeppa type constant velocity universal joint (BJ) and an undercut free type constant velocity universal joint (UJ) of a ball type including balls that are used as the torque transmitting members. Further, examples of the plunging type constant velocity universal joint include a double offset type constant velocity universal joint (DOJ) of a ball type including balls that are used as the torque transmitting members. Those constant velocity universal joints generally include six balls.

CITATION LIST

Patent Literature 1: JP 4041657 B

SUMMARY OF INVENTION

Technical Problems

By the way, in recent years, there have been strong demands for lightweight and downsized constant velocity universal joints. In view of the circumstances, there has been proposed an eight-ball constant velocity universal joint including a larger number of balls so as to reduce a load per ball, the balls being reduced in ball diameter so as to easily achieve downsizing.

In downsized multi-ball constant velocity universal joints such as the eight-ball constant velocity universal joint, a specification of interior dimensions such as ball PCD clearance is regulated to enhance durability under high load and suppress variation in life (refer, for example, to Patent Literature 1).

However, in the downsized multi-ball constant velocity universal joints as described above, when the ball diameter is reduced, a depth of the track grooves of each of the outer joint member and the inner joint member is reduced in accordance therewith. In this case, a phenomenon that the balls under high load in the track grooves run onto track edge portions (boundary portions between the track grooves and the inner peripheral surface of the outer joint member, or boundary portions between the track grooves and the outer peripheral surface of the inner joint member) is liable to occur.

In the case where the balls run onto the track edge portions, the balls may be scratched due to interference between the balls and the track edge portions, which influences the constant velocity universal joints to be shortened in life.

In view of the circumstances, the present invention has been proposed to solve the problem described above, and it is an object thereof to provide a constant velocity universal joint capable of suppressing life shortening that may occur in a case where balls under high load run onto track edge portions, and to provide a method of producing the constant velocity universal joint.

Solution to Problem

As a technical measure to achieve the above-mentioned object, the present invention provides a constant velocity universal joint, comprising: an outer joint member having an inner peripheral surface comprising track grooves that are formed at a plurality of positions on the inner peripheral surface and extend in an axial direction; an inner joint member having an outer peripheral surface comprising track grooves that are formed at a plurality of positions on the outer peripheral surface and in pairs with the track grooves of the outer joint member, the track grooves of the inner joint member extending in the axial direction; torque transmitting members interposed between the track grooves of the outer joint member and the track grooves of the inner joint member; a track chamfer provided at each boundary portion between each of the track grooves of the outer joint member and the inner peripheral surface of the outer joint member; and a track chamfer provided at each boundary portion between each of the track grooves of the inner joint member and the outer peripheral surface of the inner joint member, wherein a surface hardness at least one of the track chamfer of the outer joint member or the track chamfer of the inner joint member is set to be lower than a surface hardness of each of the track grooves of the outer joint member and the track grooves of the inner joint member.

Here, the "at least one of the track chamfer of the outer joint member or the track chamfer of the inner joint member"

encompasses a case of only the track chamfer of the outer joint member, a case of only the track chamfer of the inner joint member, and a case of both the track chamfer of the outer joint member and the track chamfer of the inner joint member.

The present invention is suited to fixed type constant velocity universal joints such as a Rzeppa type constant velocity universal joint and an undercut free type constant velocity universal joint, wherein the inner peripheral surface of the outer joint member comprises a spherical inner peripheral surface, wherein the track grooves of the outer joint member comprise circular-arc track grooves formed in the spherical inner peripheral surface, wherein the outer peripheral surface of the inner joint member comprises a spherical outer peripheral surface, wherein the track grooves of the inner joint member comprise circular-arc track grooves formed in the spherical outer peripheral surface, and wherein the torque transmitting members comprise balls retained by a cage arranged between the spherical inner peripheral surface of the outer joint member and the spherical outer peripheral surface of the inner joint member.

Further, the present invention is applicable also to a plunging type constant velocity universal joint such as a double offset type constant velocity universal joint, wherein the inner peripheral surface of the outer joint member comprises a cylindrical inner peripheral surface, wherein the track grooves of the outer joint member comprise straight track grooves formed in the cylindrical inner peripheral surface, wherein the outer peripheral surface of the inner joint member comprises a spherical outer peripheral surface, wherein the track grooves of the inner joint member comprise straight track grooves formed in the spherical outer peripheral surface, and wherein the torque transmitting members comprise balls retained by a cage arranged between the cylindrical inner peripheral surface of the outer joint member and the spherical outer peripheral surface of the inner joint member.

Further, in the present invention, it is desired that the number of the balls be eight or more. In such a multi-ball constant velocity universal joint, when a ball diameter is reduced, a depth of each of the track grooves of the outer joint member and the track grooves of the inner joint member is reduced in accordance therewith. The present invention is advantageous because a phenomenon that the balls run onto the track chamfers is more liable to occur in the multi-ball constant velocity universal joint.

In the present invention, the surface hardness at least one of the track chamfer provided at each of the boundary portions between the track grooves of the outer joint member and the inner peripheral surface of the outer joint member or the track chamfer provided at each of the boundary portions between the track grooves of the inner joint member and the outer peripheral surface of the inner joint member is set to be lower than the surface hardness of each of the track grooves of the outer joint member and the track grooves of the inner joint member. Thus, in downsized multi-ball constant velocity universal joints, even when the balls under high load run onto the track chamfer of the outer joint member or the track chamfer of the inner joint member, the balls are less liable to be scratched due to interference between the running balls and the track chamfers.

In the present invention, it is desired that the surface hardness of each of the track chamfers be set to fall within a range of from 56 HRC to 60 HRC. When the surface hardness of each of the track chamfers is set to fall within this range, the balls are reliably prevented from being scratched due to the interference between the running balls and the track chamfers. Note that, when the surface hardness of each of the track chamfers is less than 56 HRC, the track chamfers are unnecessarily soft. Thus, a strength of each of the track chamfers is insufficient. In contrast, when the surface hardness of each of the track chamfers is larger than 60 HRC, the track chamfers are unnecessarily hard. Thus, the running balls are liable to be scratched.

The present invention provides a method of producing a constant velocity universal joint, the constant velocity universal joint comprising: an outer joint member having an inner peripheral surface comprising track grooves that are formed at a plurality of positions on the inner peripheral surface and extend in an axial direction; an inner joint member having an outer peripheral surface comprising track grooves that are formed at a plurality of positions on the outer peripheral surface and in pairs with the track grooves of the outer joint member, the track grooves of the inner joint member extending in the axial direction; torque transmitting members interposed between the track grooves of the outer joint member and the track grooves of the inner joint member; a track chamfer provided at each boundary portion between each of the track grooves of the outer joint member and the inner peripheral surface of the outer joint member; and a track chamfer provided at each boundary portion between each of the track grooves of the inner joint member and the outer peripheral surface of the inner joint member, the method comprising performing heat treatment on the outer joint member and the inner joint member so that a surface hardness at least one of the track chamfer of the outer joint member or the track chamfer of the inner joint member is set to be lower than a surface hardness of each of the track grooves of the outer joint member and the track grooves of the inner joint member.

In the method according to the present invention, the surface hardness of each of the track chamfer of the outer joint member and the track chamfer of the inner joint member can be set by quenching, in a continuous pattern, the track grooves of the outer joint member and the inner peripheral surface of the outer joint member, and the track grooves of the inner joint member and the outer peripheral surface of the inner joint member, and then performing tempering while increasing a tempering amount at least one of the track chamfer of the outer joint member or the track chamfer of the inner joint member. Alternatively, the surface hardness of each of the track chamfer of the outer joint member and the track chamfer of the inner joint member can be set also by quenching, in a discontinuous pattern, the track grooves of the outer joint member and the inner peripheral surface of the outer joint member, and the track grooves of the inner joint member and the outer peripheral surface of the inner joint member to quench parts except for at least one of the track chamfer of the outer joint member or the track chamfer of the inner joint member. Still alternatively, the surface hardness of each of the track chamfer of the outer joint member and the track chamfer of the inner joint member can be set also by quenching, in a continuous pattern, the track grooves of the outer joint member and the inner peripheral surface of the outer joint member, and the track grooves of the inner joint member and the outer peripheral surface of the inner joint member, and then by removing a surface hardened layer at least one of the track chamfer of the outer joint member or the track chamfer of the inner joint member. In this way, the surface hardness of each of the track chamfer of the outer joint member and the track chamfer of the inner joint member can be appropriately set in accordance with combinations of heat treatment and/or a machining process.

Advantageous Effects of Invention

According to the present invention, the surface hardness at least one of the track chamfer provided at each of the boundary portions between the track grooves of the outer joint member and the inner peripheral surface of the outer joint member or the track chamfer provided at each of the boundary portions between the track grooves of the inner joint member and the outer peripheral surface of the inner joint member is set to be lower than the surface hardness of each of the track grooves. Thus, in downsized multi-ball constant velocity universal joints, even when the balls under high load run onto the track chamfers, the balls are less liable to be scratched due to interference between the running balls and the track chamfers. As a result, life shortening that may be caused by the balls that run under high load onto the track chamfers can be suppressed, and hence a highly-reliable and long-life constant velocity universal joint can be provided.

BRIEF DESCRIPTION OF DRAWINGS

FIG. 3A is a vertical sectional view of an outer joint member of the constant velocity universal joint of FIG. 1.

FIG. 3B is a right side view of the outer joint member of the constant velocity universal joint of FIG. 1.

DESCRIPTION OF EMBODIMENTS

In the following, detailed description is made of a constant velocity universal joint according to an embodiment of the present invention. The following embodiment exemplifies a Rzeppa type constant velocity universal joint (BJ) of a ball type comprising balls that are used as torque transmitting members. However, the present invention is applicable also to other constant velocity universal joints of the ball type, such as an undercut free type constant velocity universal joint (UJ), and to other plunging type constant velocity universal joints of the ball type, such as a double offset type constant velocity universal joint (DOJ). Further, in the case exemplified in the following embodiment, the present invention is applied to a constant velocity universal joint of an eight ball type. However, the present invention is suited to multi-ball constant velocity universal joints comprising eight or more balls.

Figure 1:
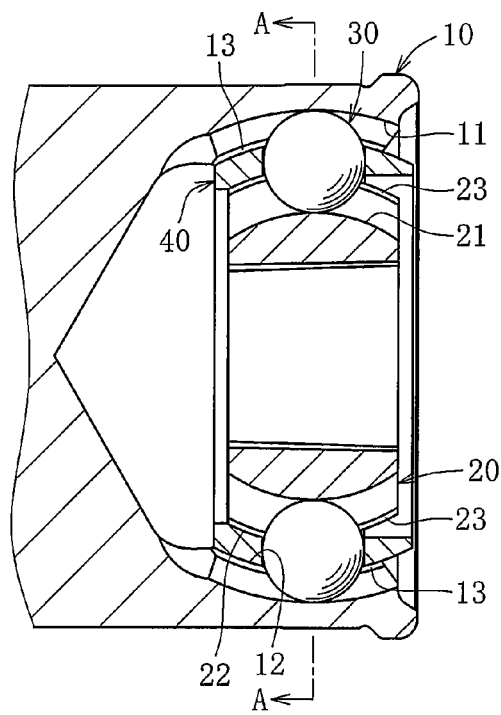
FIG. 1 is a vertical sectional view of an overall structure of a Rzeppa type constant velocity universal joint according to an embodiment of the present invention.
Figure 2:
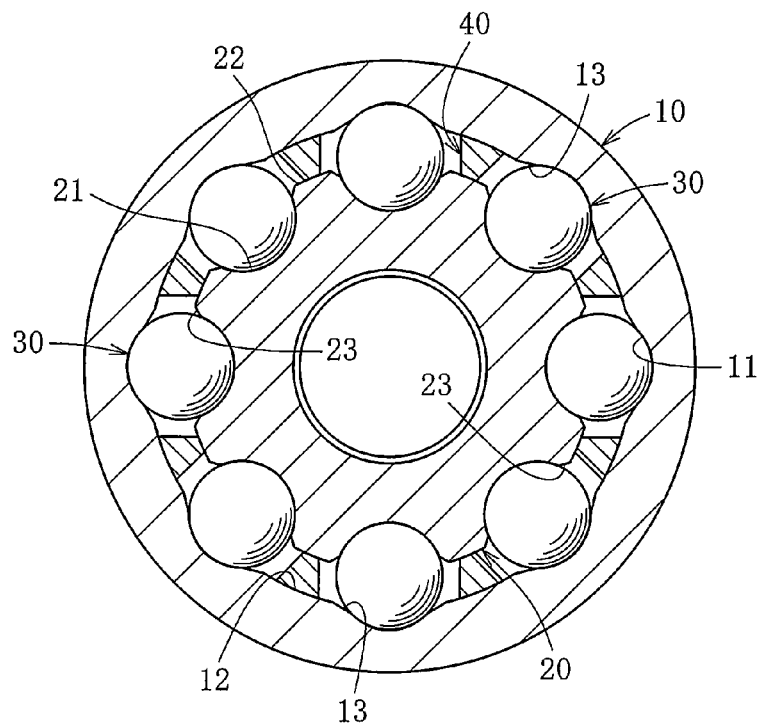
FIG. 2 is a sectional view taken along the line A-A of FIG. 1.

As illustrated in FIGS. 1 and 2, the Rzeppa type constant velocity universal joint according to the embodiment of the present invention comprises, as a main part, an outer joint member 10 having a spherical inner peripheral surface 12 comprising eight circular-arc track grooves 11 that are equi-angularly formed and extend in an axial direction, an inner joint member 20 having a spherical outer peripheral surface 22 comprising eight circular-arc track grooves 21 that are formed in pairs with the track grooves 11 of the outer joint member 10, eight balls 30 as torque transmitting members interposed between the track grooves 11 of the outer joint member 10 and the track grooves 21 of the inner joint member 20, and a cage 40 arranged between the spherical inner peripheral surface 12 of the outer joint member 10 and the spherical outer peripheral surface 22 of the inner joint member 20 so as to retain the balls 30.

Figure 4A:
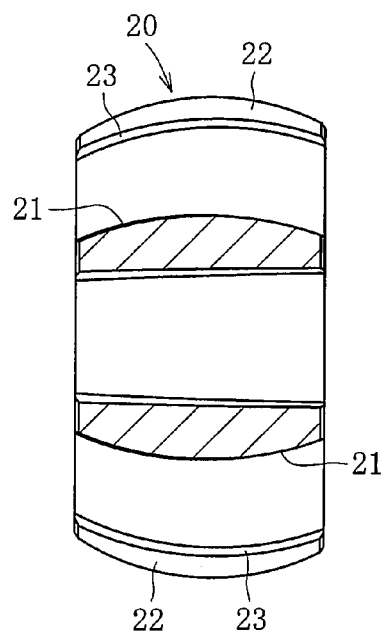
FIG. 4A is a vertical sectional view of an inner joint member of the constant velocity universal joint of FIG. 1.
Figure 4B:
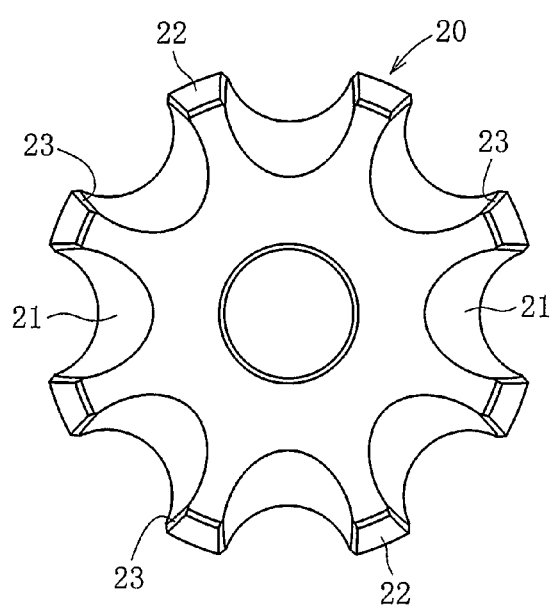
FIG. 4B is a right side view of the inner joint member of the constant velocity universal joint of FIG. 1.

As illustrated in FIGS. 3A and 3B, the outer joint member 10 of the constant velocity universal joint comprises a track chamfer 13 as a track edge portion provided at each boundary portion between each of the track grooves 11 and the spherical inner peripheral surface 12 on each side thereof. Further, as illustrated in FIGS. 4A and 4B, the inner joint member 20 comprises a track chamfer 23 as a track edge portion provided at each boundary portion between each of the track grooves 21 and the spherical outer peripheral surface 22 on each side thereof. The track chamfers 13 and 23 are configured to alleviate stress concentration at the track edge portions, and each may be formed into a shape of a flat tapered surface or a shape of a convex rounded curved surface. The track chamfers 13 and 23 may each have an arbitrary shape in cross-section.

In the Rzeppa type constant velocity universal joint according to this embodiment, a surface hardness of each of the track chamfers 13 and 23 is set to be lower than a surface hardness of each of the track grooves 11 and 21. Normally, the surface hardness of each of the track grooves 11 and 21 ranges from approximately 61 HRC to 63 HRC, and the surface hardness of each of the track chamfers 13 and 23 is set to fall within a range of from 56 HRC to 60 HRC.

In this way, the surface hardness of each of the track chamfers 13 and 23 is set to be lower than the surface hardness of each of the track grooves 11 and 21, that is, the track chamfers 13 and 23 are formed to be soft. With this, in the downsized constant velocity universal joint comprising the eight balls 30, even when the balls 30 under high load run onto the track chamfers 13 and 23 provided respectively as the boundary portion between each of the track grooves 11 and the inner peripheral surface 12 of the outer joint member 10 and the boundary portion between each of the track grooves 21 and the outer peripheral surface 22 of the inner joint member 20, the balls 30 are less liable to be scratched due to interference between the running balls 30 and the track chamfers 13 and 23.

In particular, when the surface hardness of each of the track chamfers 13 and 23 is set to fall within the range of from 56 HRC to 60 HRC, the balls 30 are reliably prevented from being scratched due to the interference between the running balls 30 and the track chamfers 13 and 23. Note that, when the surface hardness of each of the track chamfers 13 and 23 is less than 56 HRC, the track chamfers 13 and 23 are unnecessarily soft. Thus, a strength of each of the track chamfers is insufficient. In contrast, when the surface hardness of each of the track chamfers 13 and 23 is larger than 60 HRC, the track chamfers 13 and 23 are unnecessarily hard. Thus, the running balls 30 are liable to be scratched.

Heat treatment is performed on the outer joint member and the inner joint member so that, as described above in this embodiment, the surface hardness of each of the track chamfers 13 and 23 is lower than the surface hardness of each of the track grooves 11 and 21. In that case, in order to set the surface hardness of each of the track chamfers to fall within the range of from 56 HRC to 60 HRC, it is appropriate to use the methods as described below.

First, in a first method, the track grooves 11 and the inner peripheral surface 12 of the outer joint member 10 and the track grooves 21 and the outer peripheral surface 22 of the inner joint member 20 are quenched overall in a continuous pattern through normal carburizing or induction hardening and tempering. With this, a required surface hardness of, for example, approximately 63 HRC is secured for each of the track grooves 11 and the inner peripheral surface 12 of the outer joint member 10 and the track grooves 21 and the outer peripheral surface 22 of the inner joint member 20. After that, the surface hardness is partially controlled by an induction tempering process employed in a tempering step. In other words, a tempering amount is partially increased at each of the track chamfers 13 and 23 through the tempering using the induction tempering process so that the surface hardness of each of the track chamfers 13 and 23 is lowered to fall within the range of from 56 HRC to 60 HRC.

Further, in a second method, the track grooves 11 and the inner peripheral surface 12 of the outer joint member 10 and the track grooves 21 and the outer peripheral surface 22 of the inner joint member 20 are quenched in a discontinuous pattern through induction hardening and tempering so that parts except for the track chamfers 13 and 23 are quenched. In this way, the surface hardness of each of the track chamfers 13 and 23 is set to fall within the range of from 56 HRC to 60 HRC.

Still further, in a third method, the track grooves 11 and the inner peripheral surface 12 of the outer joint member 10 and the track grooves 21 and the outer peripheral surface 22 of the inner joint member 20 are quenched overall in a continuous pattern through normal carburizing or induction hardening and tempering. With this, a required surface hardness of, for example, approximately 63 HRC is secured for each of the track grooves 11 and the inner peripheral surface 12 of the outer joint member 10 and the track grooves 21 and the outer peripheral surface 22 of the inner joint member 20. After that, a machining process, specifically, a finishing process such as quenched-steel trimming and grinding is performed to remove surface hardened layers of the track chamfers 13 and 23. In this way, the surface hardness of each of the track chamfers 13 and 23 is set to fall within the range of from 56 HRC to 60 HRC.

In the case of the embodiment described above, the surface hardness of each of the track chamfer 13 of the outer joint member 10 and the track chamfer 23 of the inner joint member 20 is set to be lower than the surface hardness of each of the track grooves 11 and 21. However, the surface hardness of only any one of the track chamfer 13 of the outer joint member 10 and the track chamfer 23 of the inner joint member 20 may be set to be lower than the surface hardness of each of the track grooves 11 and 21.

In the case of the embodiment exemplified above, the present invention is applied to a fixed type constant velocity universal joint, specifically, a Rzeppa type constant velocity universal joint. However, the present invention is not limited thereto, and may be applied also to plunging type constant velocity universal joints such as a double offset type constant velocity universal joint.

Figure 5:
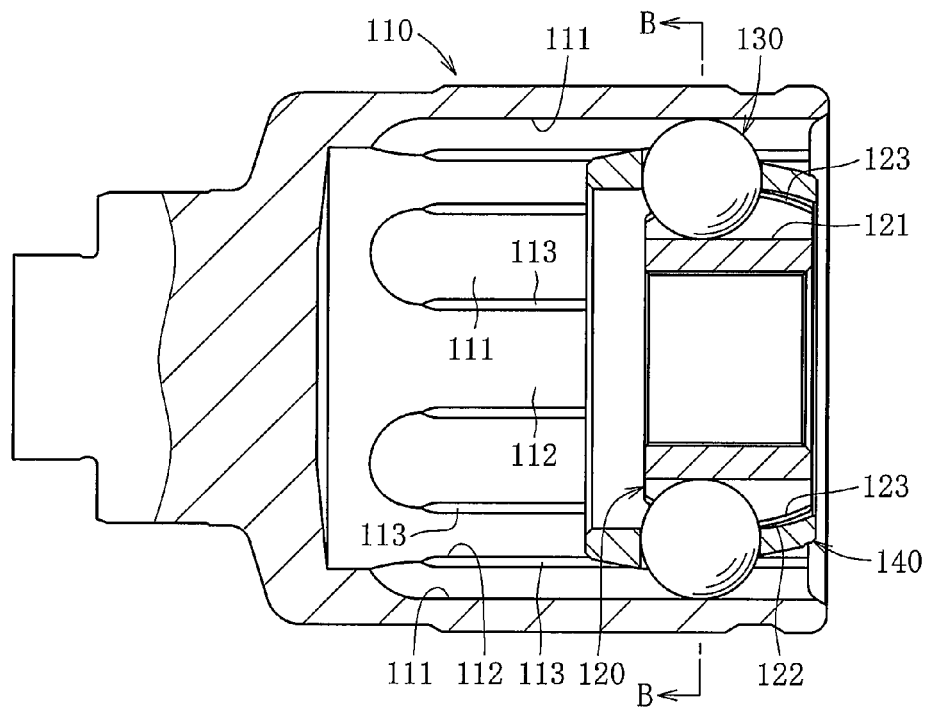
FIG. 5 is a vertical sectional view of an overall structure of a double offset type constant velocity universal joint according to another embodiment of the present invention.
Figure 6:
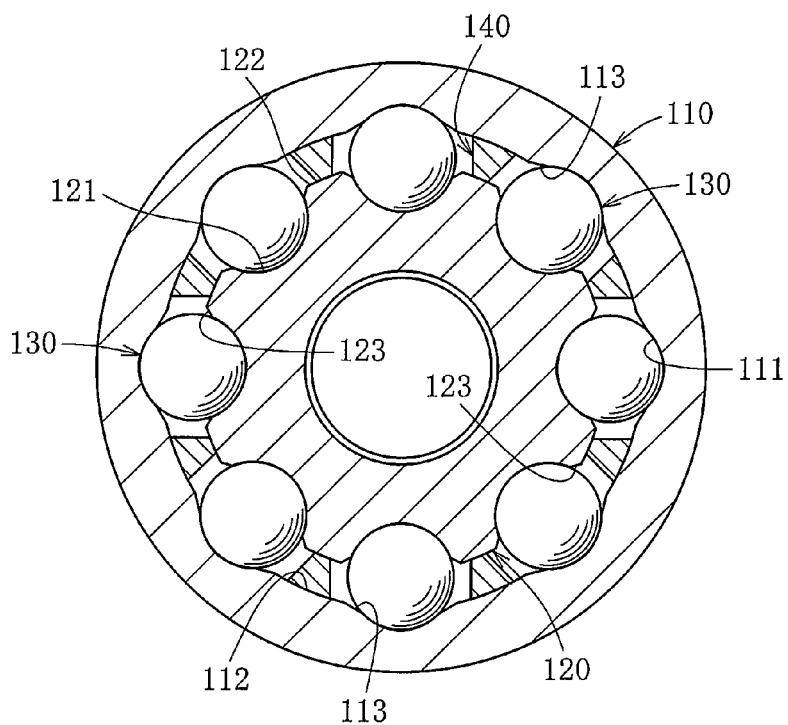
FIG. 6 is a sectional view taken along the line B-B of FIG. 5.

As illustrated in FIGS. 5 and 6, the double offset type constant velocity universal joint comprises, as a main part, an outer joint member 110 having a cylindrical inner peripheral surface 112 comprising eight straight track grooves 111 that are equiangularly formed and extend in an axial direction, an inner joint member 120 having a spherical outer peripheral surface 122 comprising eight straight track grooves 121 that are formed in pairs with the track grooves 111 of the outer joint member 110, eight balls 130 as torque transmitting members interposed between the track grooves 111 of the outer joint member 110 and the track grooves 121 of the inner joint member 120, and a cage 140 arranged between the cylindrical inner peripheral surface 112 of the outer joint member 110 and the spherical outer peripheral surface 122 of the inner joint member 120 so as to retain the balls 130.

Figure 7A:
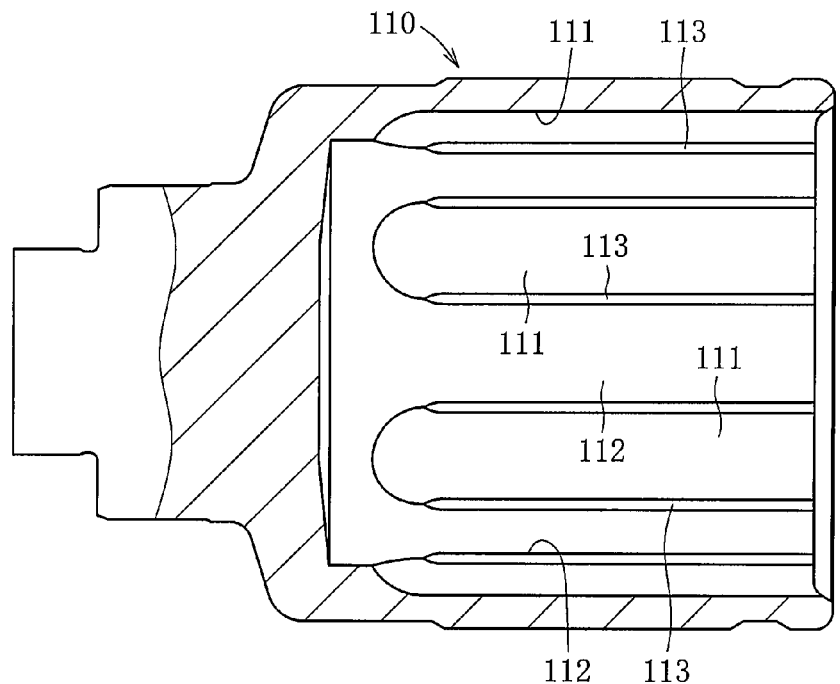
FIG. 7A is a vertical sectional view of an outer joint member of the constant velocity universal joint of FIG. 5.
Figure 7B:
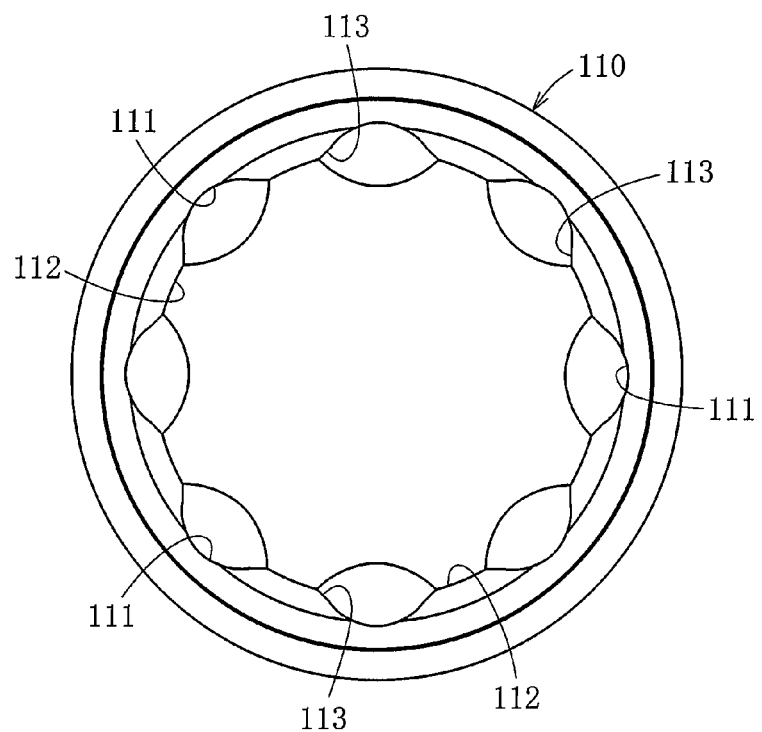
FIG. 7B is a right side view of the outer joint member of the constant velocity universal joint of FIG. 5.
Figure 8A:
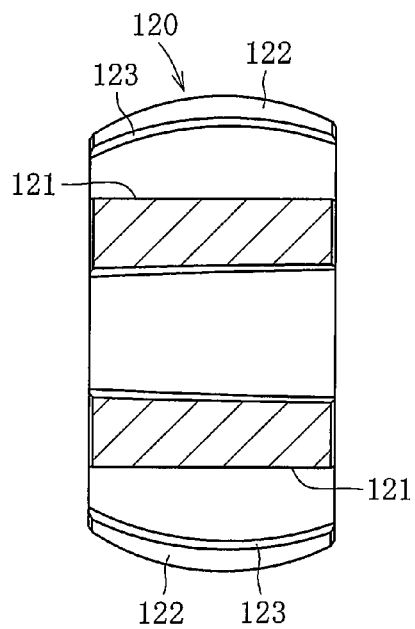
FIG. 8A is a vertical sectional view of an inner joint member of the constant velocity universal joint of FIG. 5.
Figure 8B:
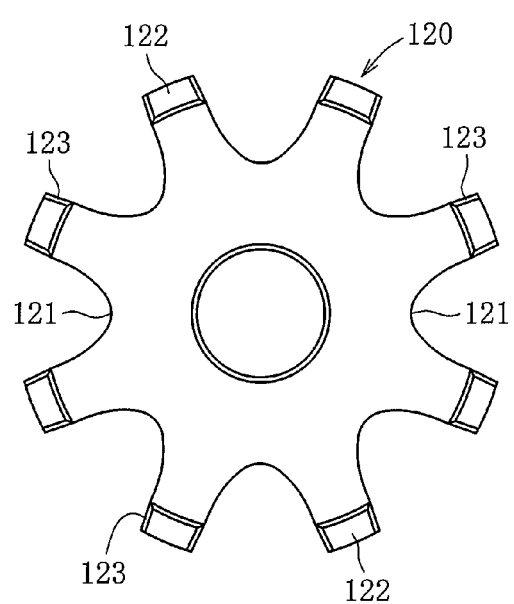
FIG. 8B is a right side view of the inner joint member of the constant velocity universal joint of FIG. 5.

As illustrated in FIGS. 7A and 7B, the outer joint member 110 of the constant velocity universal joint comprises a track chamfer 113 as a track edge portion provided at each boundary portion between each of the track grooves 111 and the cylindrical inner peripheral surface 112 on each side thereof. Further, as illustrated in FIGS. 8A and 8B, the inner joint member 120 comprises a track chamfer 123 as a track edge portion provided at each boundary portion between each of the track grooves 121 and the spherical outer peripheral surface 122 on each side thereof.

In this embodiment in which the present invention is applied to the double offset type constant velocity universal joint, a surface hardness of each of the track chamfers 113 and 123 is set to be lower than a surface hardness of each of the track grooves 111 and 121. Numerical ranges of the surface hardness of each of the track chamfers 113 and 123 and the surface hardness of each of the track grooves 111 and 121, and a method for setting the surface hardnesses, such as the heat treatment, are the same as those in the case of the embodiment of the Rzeppa type constant velocity universal joint described above.

The present invention is not limited to the above-mentioned embodiments. As a matter of course, various modifications can be made thereto without departing from the spirit of the present invention. The scope of the present invention is defined in claims, and encompasses equivalents described in claims and all changes within the scope of claims.

The invention claimed is:

1. A constant velocity universal joint, comprising:
   an outer joint member having an inner peripheral surface comprising track grooves that are formed at a plurality of positions on the inner peripheral surface and extend in an axial direction;
   an inner joint member having an outer peripheral surface comprising track grooves that are formed at a plurality of positions on the outer peripheral surface and in pairs with the track grooves of the outer joint member, the track grooves of the inner joint member extending in the axial direction;
   torque transmitting members interposed between the track grooves of the outer joint member and the track grooves of the inner joint member;
   a track chamfer provided at each boundary portion between each of the track grooves of the outer joint member and the inner peripheral surface of the outer joint member; and
   a track chamfer provided at each boundary portion between each of the track grooves of the inner joint member and the outer peripheral surface of the inner joint member,
   wherein a surface hardness at least one of the track chamfer of the outer joint member or the track chamfer of the inner joint member is set to be lower than a surface hardness of each of the track grooves of the outer joint member and the track grooves of the inner joint member.

2. The constant velocity universal joint according to claim 1, wherein the surface hardness at least one of the track chamfer of the outer joint member or the track chamfer of the inner joint member is set to fall within a range of from 56 HRC to 60 HRC.

3. The constant velocity universal joint according to claim 2, wherein the inner peripheral surface of the outer joint member comprises a spherical inner peripheral surface, wherein the track grooves of the outer joint member comprise circular-arc track grooves formed in the spherical inner peripheral surface, wherein the outer peripheral surface of the inner joint member comprises a spherical outer peripheral surface, wherein the track grooves of the inner joint member comprise circular-arc track grooves formed in the spherical outer peripheral surface, and wherein the torque transmitting members comprise balls retained by a cage arranged between the spherical inner peripheral surface of the outer joint member and the spherical outer peripheral surface of the inner joint member.

4. The constant velocity universal joint according to claim 2, wherein the inner peripheral surface of the outer joint member comprises a cylindrical inner peripheral surface, wherein the track grooves of the outer joint member comprise straight track grooves formed in the cylindrical inner peripheral surface, wherein the outer peripheral surface of the inner joint member comprises a spherical outer peripheral surface, wherein the track grooves of the inner joint member comprise straight track grooves formed in the spherical outer peripheral surface, and wherein the torque transmitting members comprise balls retained by a cage arranged between the cylindrical inner peripheral surface of the outer joint member and the spherical outer peripheral surface of the inner joint member.

5. The constant velocity universal joint according to claim 4, wherein the balls comprise eight or more balls.

6. The constant velocity universal joint according to claim 1, wherein the inner peripheral surface of the outer joint member comprises a spherical inner peripheral surface, wherein the track grooves of the outer joint member comprise circular-arc track grooves formed in the spherical inner peripheral surface, wherein the outer peripheral surface of the inner joint member comprises a spherical outer peripheral surface, wherein the track grooves of the inner joint member comprise circular-arc track grooves formed in the spherical outer peripheral surface, and wherein the torque transmitting members comprise balls retained by a cage arranged between the spherical inner peripheral surface of the outer joint member and the spherical outer peripheral surface of the inner joint member.

7. The constant velocity universal joint according to claim 6, wherein the balls comprise eight or more balls.

8. The constant velocity universal joint according to claim 1, wherein the inner peripheral surface of the outer joint member comprises a cylindrical inner peripheral surface, wherein the track grooves of the outer joint member comprise straight track grooves formed in the cylindrical inner peripheral surface, wherein the outer peripheral surface of the inner joint member comprises a spherical outer peripheral surface, wherein the track grooves of the inner joint member comprise straight track grooves formed in the spherical outer peripheral surface, and wherein the torque transmitting members comprise balls retained by a cage arranged between the cylindrical inner peripheral surface of the outer joint member and the spherical outer peripheral surface of the inner joint member.

9. The constant velocity universal joint according to claim 8, wherein the balls comprise eight or more balls.

10. A method of producing a constant velocity universal joint, the constant velocity universal joint comprising:

an outer joint member having an inner peripheral surface comprising track grooves that are formed at a plurality of positions on the inner peripheral surface and extend in an axial direction;

an inner joint member having an outer peripheral surface comprising track grooves that are formed at a plurality of positions on the outer peripheral surface and in pairs with the track grooves of the outer joint member, the track grooves of the inner joint member extending in the axial direction;

torque transmitting members interposed between the track grooves of the outer joint member and the track grooves of the inner joint member;

a track chamfer provided at each boundary portion between each of the track grooves of the outer joint member and the inner peripheral surface of the outer joint member; and a track chamfer provided at each boundary portion between each of the track grooves of the inner joint member and the outer peripheral surface of the inner joint member, the method comprising performing heat treatment on the outer joint member and the inner joint member so that a surface hardness at least one of the track chamfer of the outer joint member or the track chamfer of the inner joint member is set to be lower than a surface hardness of each of the track grooves of the outer joint member and the track grooves of the inner joint member.

11. The method of producing a constant velocity universal joint according to claim 10, wherein the surface hardness of each of the track chamfer of the outer joint member or the track chamfer of the inner joint member is set by quenching, in a continuous pattern, the track grooves of the outer joint member and the inner peripheral surface of the outer joint member, and the track grooves of the inner joint member and the outer peripheral surface of the inner joint member, and then by performing tempering while increasing a tempering amount at least one of the track chamfer of the outer joint member or the track chamfer of the inner joint member.

12. The method of producing a constant velocity universal joint according to claim 10, wherein the surface hardness of each of the track chamfer of the outer joint member and the track chamfer of the inner joint member is set by quenching, in a discontinuous pattern, the track grooves of the outer joint member and the inner peripheral surface of the outer joint member, and the track grooves of the inner joint member and the outer peripheral surface of the inner joint member to quench parts except for at least one of the track chamfer of the outer joint member or the track chamfer of the inner joint member.

13. The method of producing a constant velocity universal joint according to claim 10, wherein the surface hardness of each of the track chamfer of the outer joint member and the track chamfer of the inner joint member is set by quenching, in a continuous pattern, the track grooves of the outer joint member and the inner peripheral surface of the outer joint member, and the track grooves of the inner joint member and the outer peripheral surface of the inner joint member, and then by removing a surface hardened layer at least one of the track chamfer of the outer joint member or the track chamfer of the inner joint member.

* * * * *